(12) United States Patent
Takee

(10) Patent No.: US 6,551,737 B1
(45) Date of Patent: Apr. 22, 2003

(54) CYLINDRICAL ALKALINE STORAGE BATTERY

(75) Inventor: Masao Takee, Itano-Gun (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 0 days.

(21) Appl. No.: 09/539,213

(22) Filed: Mar. 30, 2000

(30) Foreign Application Priority Data

Mar. 30, 1999 (JP) .......................... 11-089580

(51) Int. Cl.⁷ .......................... H01M 6/10; H01M 4/62; H01M 6/00
(52) U.S. Cl. .......................... 429/94; 429/217; 429/218; 429/206; 429/208; 29/623.1
(58) Field of Search .................. 429/206, 208, 429/94, 217, 218, 623.1–623.5

(56) References Cited

U.S. PATENT DOCUMENTS

| | | | | |
|---|---|---|---|---|
| 3,859,195 A | * | 1/1975 | Williams | 204/272 |
| 4,552,821 A | * | 11/1985 | Gibbard et al. | 429/57 |
| 4,707,421 A | * | 11/1987 | McVeigh et al. | 429/94 |
| 4,929,519 A | * | 5/1990 | Catotti | 429/94 |
| 4,937,154 A | * | 6/1990 | Moses et al. | 429/94 |
| 4,975,095 A | * | 12/1990 | Strickland et al. | 29/623.1 |
| 5,106,707 A | * | 4/1992 | Catotti et al. | 429/94 |
| 5,323,527 A | * | 6/1994 | Ribordy et al. | 29/623.1 |
| 5,595,835 A | * | 1/1997 | Miyamoto et al. | 429/56 |
| 5,637,416 A | * | 6/1997 | Yoshii et al. | 429/94 |
| 5,654,114 A | * | 8/1997 | Kubota et al. | 429/218 |
| 5,667,907 A | * | 9/1997 | Audit et al. | 429/94 |
| 5,871,862 A | * | 2/1999 | Olson | 429/217 |
| 5,989,743 A | * | 11/1999 | Yamashita | 429/129 |
| 6,232,012 B1 | * | 5/2001 | Howard et al. | 429/94 |
| 6,261,720 B1 | * | 7/2001 | Kimiya et al. | 429/223 |
| 6,270,535 B1 | * | 8/2001 | Singh | 29/623.1 |

FOREIGN PATENT DOCUMENTS

JP 5-234598 9/1993

* cited by examiner

Primary Examiner—Tom Dunn
Assistant Examiner—L. Edmondson
(74) Attorney, Agent, or Firm—Nixon & Vanderhye P.C.

(57) ABSTRACT

A cylindrical alkaline storage battery including a group of spiral electrodes composed of positive and negative electrode plates spirally wound with a separator interposed therebetween. A winding end of the positive electrode plate is positioned in a maximum diameter portion of the group of spiral electrodes. The separator is reinforced by an additional separator of the same kind of material adhered thereto at an outside of the winding end of the positive electrode plate.

8 Claims, 5 Drawing Sheets

CYLINDRICAL ALKALINE STORAGE BATTERY

BACKGROUND OF THE INVENTION

1. Field of the Invention

The present invention relates to a cylindrical alkaline storage battery including a group of spiral electrodes composed of positive and negative electrode plates spirally wound with a separator interposed therebetween, and more particularly to an improvement of an internal structure of the group of spiral electrodes.

2. Description of the Prior Art

In recent years, a cylindrical alkaline storage battery of higher capacity is required for use in various kinds of portable electronic apparatuses and communication equipments. To satisfy the requirements, there have been proposed various methods for impregnating an active material at a higher density in a cell casing of limited volume and for producing the separator as thin as possible. Accordingly, an occupancy ratio of the group of electrodes in the cell casing tends to be increased. This results in an increase of an occurrence ratio of short-circuit in the cell casing due to an increase of pressure force applied to the group of electrodes in the cell casing. To avoid such a problem, it has been proposed in Japanese Patent Laid-open Publication No. 5-234598 to provide a group of spiral electrodes in which a separator is covered with an adhesive tape of alkali resistance at the outside of a positive electrode plate placed at an outermost periphery of the group of spiral electrodes to restrain the occurrence of short-circuit in the cell casing.

To investigate the cause of internal short-circuit in the cell casing, the inventor disassembled storage batteries 30, 40 and 50 respectively shown in FIGS. 3, 4 and 5, where an internal short-circuit occurred therein. As a result, in the storage battery 30 including a group of spiral electrodes B composed of positive and negative electrode plates 31 and 32 spirally wound with a separator 33 interposed therebetween and contained in a cell casing 30*a* as shown in FIG. 3, an internal short-circuit was found at a point X between a winding end 31*a* of the positive electrode plate 31 and a portion of the negative electrode plate located at the outside of winding end 31*a* in a condition wherein the winding end 31*a* was placed on a maxim diametric line b—b of the group of spiral electrodes.

In the storage battery 40 including a group of spiral electrodes C composed of positive and negative electrode plates 41 and 42 spirally wound with a separator 43 interposed therebetween and contained in a cell casing 40 as shown in FIG. 4, an internal short-circuit was found at a point Y between the positive electrode plate 41 placed on a maximum diametric line c—c of the group of spiral electrodes 40 and the negative electrode plate 42 in a condition where a winding end 41*a* of positive electrode plate 41 was positioned on a line d—d displaced from the maximum diametric line c—c.

In the storage battery 50 including a group of spiral electrodes D composed of positive and negative electrode plates 51 and 52 spirally wound with a separator 53 interposed therebetween and contained in a cell casing 50*a* as shown in FIG. 5, an internal short-circuit was found at a point Z between the positive electrode plate 51 placed on a maximum diametric line e—e of the group of spiral electrodes D and the negative electrode plate in a condition where a winding end 51*a* of positive electrode plate 51 was positioned on a line f—f displaced from the maximum diametric line e—e.

From the foregoing facts, it has been found that even if the separator was covered with an adhesive tape of alkali resistance adhered thereto at the outside of the positive electrode plate placed at an outermost periphery of the group of spiral electrodes as proposed in Japanese Patent Laid-open Publication 5-234598, the adhesive tape would be ineffective to restrain an occurrence of internal short-circuit in the storage battery. It has been also found that the adhesive tape disturbs an internal reaction in the storage battery as it is not hydrophilic, resulting in a decrease of the battery capacity.

SUMMARY OF THE INVENTION

It is, therefore, a primary object of the present invention to provide a cylindrical alkaline storage battery wherein the separator is reinforced by an additional separator of the same kind of material as that of the separator adhered thereto to avoid an occurrence of the internal short-circuit discussed above without causing any decrease of the battery capacity.

According to the present invention, the object is accomplished by providing a cylindrical alkaline storage battery including a group of spiral electrodes composed of positive and negative electrode plates spirally wound with a separator interposed therebetween, wherein a winding end of the positive electrode plate is positioned in a maximum diameter portion of the group of spiral electrodes, and wherein the separator is reinforced by an additional separator of the same kind of its material adhered thereto at an outside of the winding end of the positive electrode plate.

In the case that the winding end of the positive electrode plate is positioned in the maximum diameter portion of the group of spiral electrodes in which a pressure force applied from the cell casing increases more than that in the other portion, an internal short-circuit will occur between the winding end of the positive electrode plate and the negative electrode plate opposed to each other through the separator. For this reason, the reinforcement of the separator at the outside of the winding end of the positive electrode plate is effective to restrain the occurrence of internal short-circuit in the storage battery As the additional separator of the same kind of material as that of the separator is hydrophilic, the additional separator is useful to effectively restrain the occurrence of internal short-circuit without casing any decrease of the battery capacity.

In a practical embodiment, it is preferable that the positive electrode is made of an electrode substrate plate in the form of a porous metal plate such as a foamed nickel plate having a three dimensional mesh-structure impregnated with an active material and rolled under pressure. In use of the positive electrode plate, the additional separator is more useful to prevent an occurrence of internal short-circuit caused by bur fragments of the positive electrode plate. Particularly, in the case that the electrode core plate impregnated with the active material was cut into a predetermined length after rolled under pressure, numberless bur fragments will occur at the cut edge of the positive electrode plate. In such a case, the additional separator becomes more useful to prevent an occurrence of short-circuit in the storage battery.

In case that the winding end of the positive electrode plate placed at the outermost periphery of the group of spiral electrodes is not secured in place by means of a separator or an adhesive tape, the winding end of the positive electrode plate is wound off due to spring-back phenomenon thereof. This causes a short-circuit in the storage battery. Accordingly, in the case that the winding end of the positive electrode plate is secured in place by means of the additional separator adhered thereto, the additional separator becomes useful to prevent an occurrence of short-circuit as the winding end of the positive electrode plate.

BRIEF DESCRIPTION OF THE DRAWINGS

Other objects, features and advantages of the present invention will be more readily appreciated from the following detailed description of preferred embodiments thereof when taken together with reference to the accompanying drawings, in which.

DESCRIPTION OF THE PREFERRED EMBODIMENTS

Figure 1:
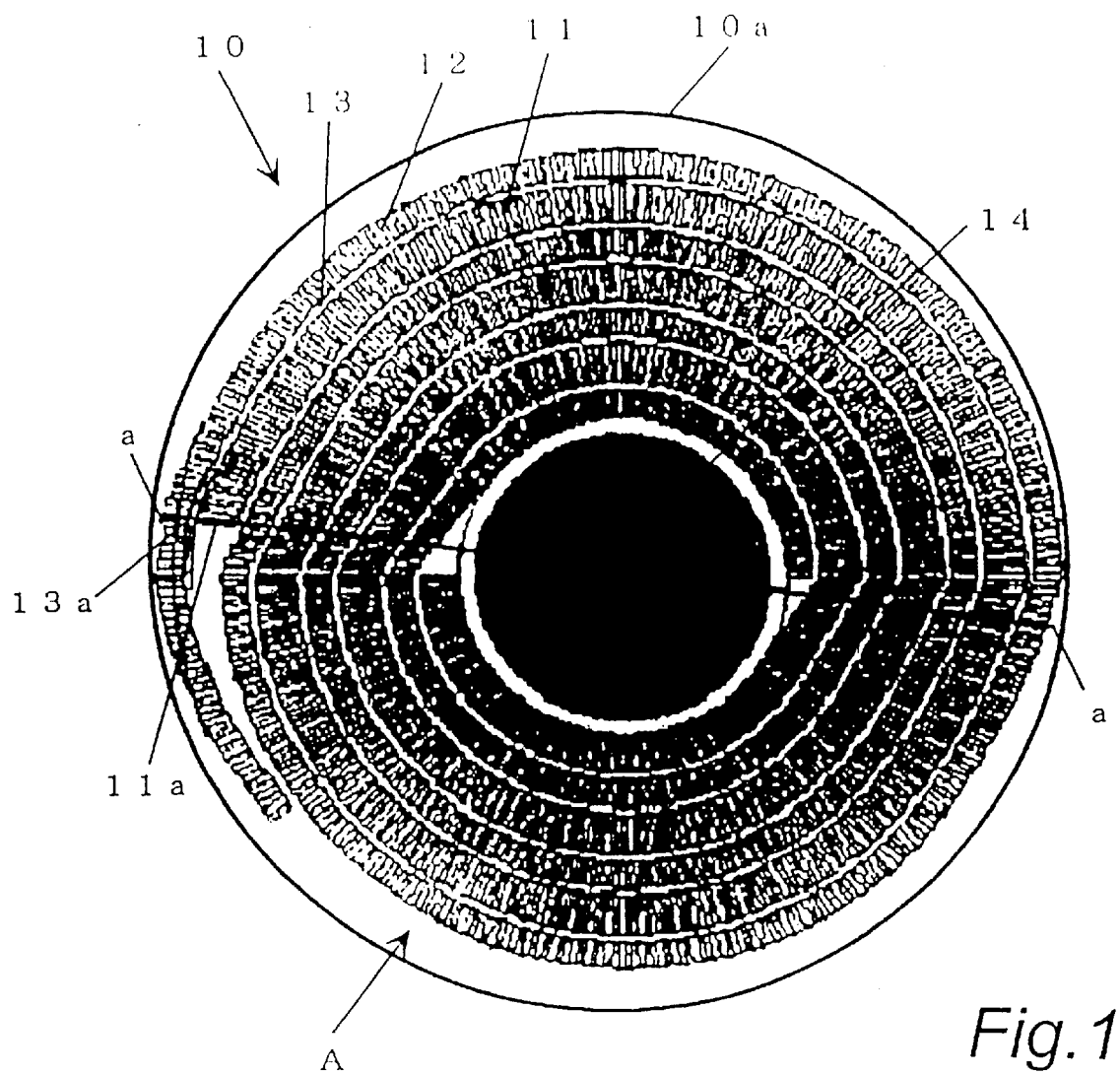
FIG. 1 is a cross-sectional view of a cylindrical nickel-metal hydride storage battery in an embodiment of the present invention.

Hereinafter, a cylindrical nickel-metal hydride storage battery in an embodiment of the present invention will be described with the drawings.

1. Production of Nickel Positive Electrode Plate

A mixture of 90 parts by weight of nickel hydroxide powder, 10 parts by weight of cobalt hydroxide powder and 3 parts by weight of zinc oxide powder was added with 50 parts by weight of an aqueous solution of 0.2 wt % hydroxypropyl cellulose and kneaded to prepare a slurry of active material. The slurry of active material was impregnated into a foamed nickel substrate plate (of about 600 g/m$^2$ in basis weight and of 95% in porosity) and rolled under pressure after dried so that the thickness of the substrate plate becomes about 0.6 mm. Thereafter, the rolled substrate plate was cut into length of about 80 mm to produce a nickel positive electrode plate 11.

2. Production of Negative Electrode Plate of Hydrogen Absorbing Alloy

Commercially available metal elements (Mm, Ni, Co, Al, Mn) measured as MmNi$_{3.2}$Co$_{1.0}$Al$_{0.2}$Mn$_{0.6}$ were molten in a high frequency melting furnace and casted to produce an ingot of hydrogen absorbing alloy. The ingot was mechanically pulverized to produce powder of the hydrogen absorbing alloy. The powder of hydrogen absorbing alloy was mixed with 10 parts by weight of an aqueous solution of 0.5% polyethylene oxide (PEO) and kneaded to prepare a slurry of hydrogen absorbing alloy. Subsequently, the slurry of hydrogen absorbing alloy was coated on opposite surfaces of an electrode core plate made of punched sheet metal and rolled under pressure after dried so that the thickness of the core plate becomes 0.40 mm. The rolled core plate was cut into length of about 105 mm to produce a negative electrode plate 12 of hydrogen absorbing alloy.

3. Manufacture of Nickel-metal Hydride Storage Battery

(1) EXAMPLE 1

The positive and negative electrode plates 11 and 12 were spirally wound through a separator 13 of polyolefin essentially consisting of polypropylene or polyethylene (of 60 g/m$^2$ in basis weight and about 0.15 mm in thickness) to produce a group of spiral electrodes A. In such an instance, the separator 13 was reinforced by an additional separator 13a of the same material as that of the separator 13 and of about 10 mm in length adhered thereto at the outside of a winding end 11a of the positive electrode plate 11 in the group of spiral electrodes A. The winding end 11a of positive electrode plate 11 was positioned on a maximum diametric line (line a—a ) of the group of spiral electrodes A.

The group of spiral electrodes A was contained in a cell casing 10a and positioned in connection with the cell casing through a current-collector in a usual manner Thereafter, the cell casing 10a was supplied with an amount of electrolyte comprised of an aqueous solution of KOH of 7N containing NaOH aid LiOH and closed by a closure element provided with a safety valve to produce a nickel-metal hydride storage battery as Example 1. In Example 1, the separator 13 was placed at the outermost periphery of the group of spiral electrodes A, and the winding end of separator 13 was secured in place by melting thereof.

(2) EXAMPLE 2

The foamed nickel substrate plate cut into a predetermined length (for example, about 80 mm) was impregnated with the slurry of active material as in Example 1 and rolled under pressure after dried to produce a positive electrode plate 11 of the predetermined length. The positive and negative electrode plates 11 and 12 were used to produce a group of spiral electrodes A in the same manner as in Example 1. Thus, the group of spiral electrodes A was used to manufacture a nickel-metal hydride storage battery 10 of Example 2 in the same manner as in Example 1. In this case, the winding end 11a of positive electrode plate 11 was positioned on a maximum diametric line (line a—a) of the group of spiral electrodes A.

(3) EXAMPLE 3

A nickel-metal hydride storage battery 10 of Example 3 was manufactured in the same manner as in Example 1, wherein the winding end 13a of separator 13 located at the outermost periphery of the group of spiral electrodes was not secured in place by melting thereof, and wherein the winding end 11a of positive electrode plate 1 was placed on a maximum diametric line (line a—a) of the group of spiral electrodes A.

(4) EXAMPLE 4

Figure 2:
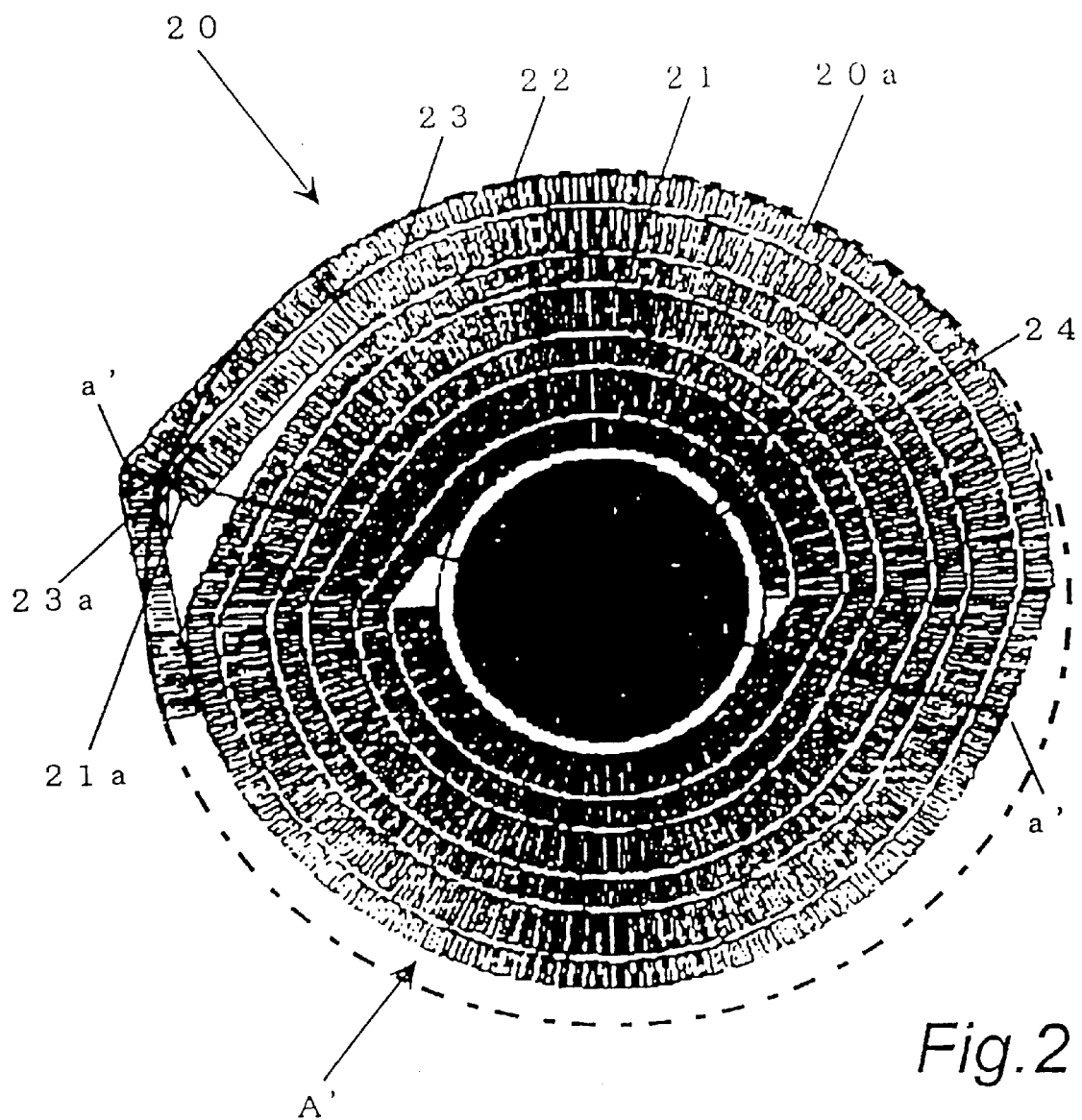
FIG. 2 is a cross-sectional view of a cylindrical nickel-metal hydride storage battery in another embodiment of the present invention.

A positive electrode plate 21 of about 0.65 mm in thickness and of about 80 mm in length and a negative electrode 22 of about 0.40 mm in thickness and of about 105 mm in length were used to produce a group of spiral electrodes A' in which an additional separator 23a was adhered to a portion of the separator 23 located at the outside of a winding end 21 a of the positive electrode plate 21 without securing the negative electrode plate 22 in place at the outermost periphery of the group of spiral electrodes A'. Thus, the group of spiral electrodes A' was used to manufacture a nickel-metal hydride storage battery 20 as Example 4 shown in FIG. 2. In the group of spiral electrodes A', the winding end 21a of positive electrode plate 21 was widened by spring-back phenomenon as shown by imaginary lines in FIG. 2 and positioned on a maximum diametric line of the group of spiral electrodes A'.

(5) COMPARATIVE EXAMPLE 1

Figure 3:
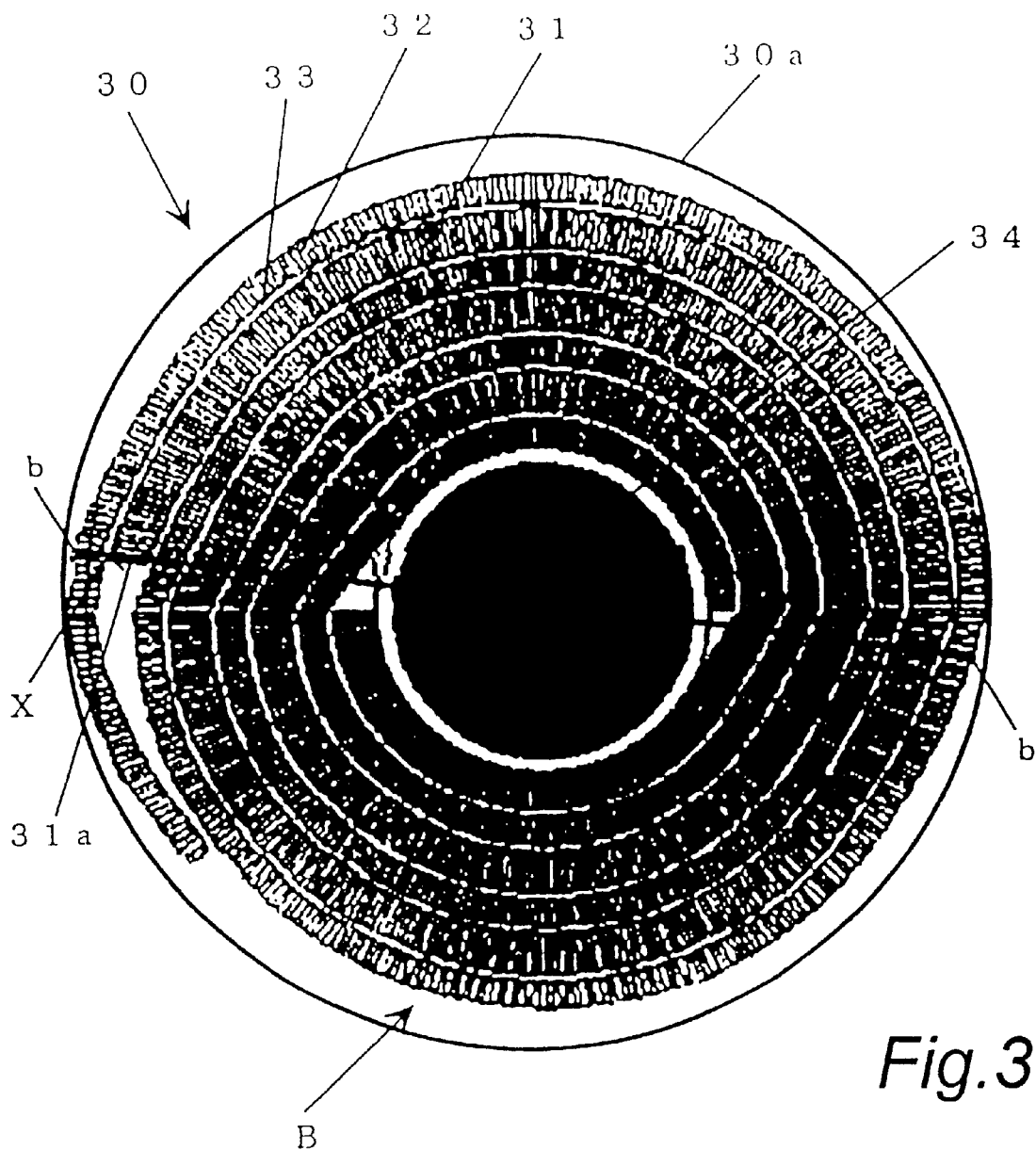
FIGS. 3 to 5 each illustrate a cross-section of each nickel-metal hydride storage battery in comparative examples.

As shown in FIG. 3, a nickel-metal hydride storage battery 30 was manufactured as Comparative Example 1 the same manner as in the nickel-metal hydride storage battery 10 of Example 1, provided that any additional separator was not adhered to a separator 33 at the outside of a winding end 31a of a positive electrode plate 31. In a group of spiral electrodes B used for the nickel-metal hydride storage battery 30, the winding end 31a of positive electrode plate 31 was positioned on a maximum diametric line (line b—b) of the group of spiral electrodes B.

(6) COMPARATIVE EXAMPLE 2

A positive electrode plate 41 of about 0.60 mm in thickness and of about 75 mm in length was used to produce a nickel-metal hydride storage battery 40 in the same manner as in the nickel-metal hydride storage battery 10 of Example 1. The storage battery 40 is shown as Comparative Example 2 in FIG. 4. In a group of spiral electrodes C of the storage battery shown in FIG. 4, a separator 43 was reinforced by an additional separator (not shown) adhered thereto at tie outside of the winding end 41a of the positive electrode plate 41. In the group of spiral electrodes C, the wind end 41a of positive electrode plate 41 was positioned on a line d—d shorter than the maximum diametric line (line c—c) of the group of spiral electrodes C.

(7) COMPARATIVE EXAMPLE 3

Figure 4:
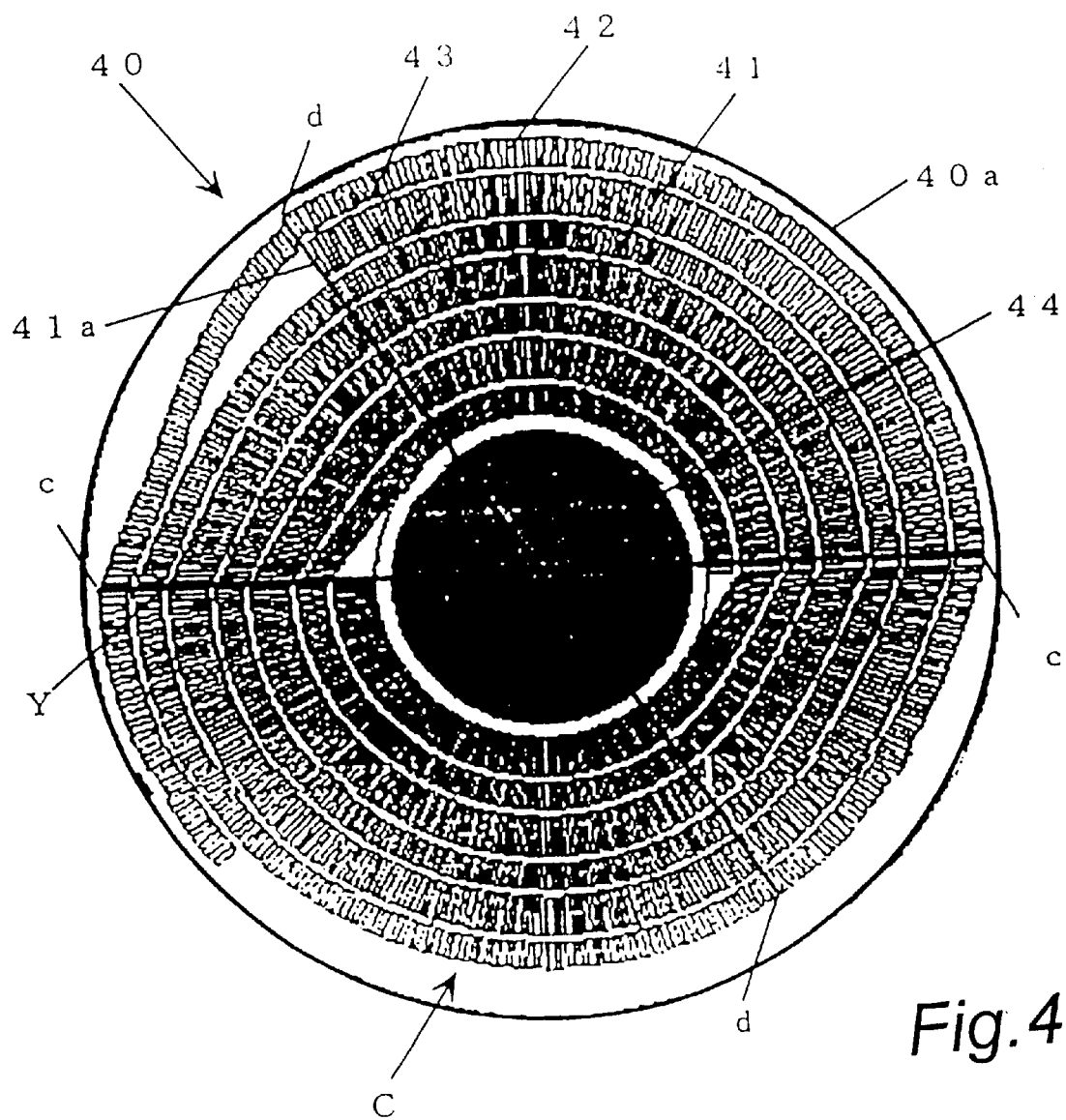

The positive electrode, plate 41 of about 0.60 mm in thickness and of about 75 mm in length was used to produce a nickel-metal hydride storage battery 40 in the same manner as in the nickel-metal hydride storage battery 10 of Example 1. In FIG. 4, the storage battery 40 is shown as Comparative Example 4. Provided that, any additional separator was not adhered to the separator 43 at the outside of the winding end 41a of the positive electrode plate 41. In a group of spiral electrodes C of the storage battery 40, the winding end 41a of the positive electrode plate 41 was positioned on a line d—d shorter than a maximum diametric line (line c—c) of the group of spiral electrodes C.

(8) COMPARATIVE EXAMPLE 4

Figure 5:
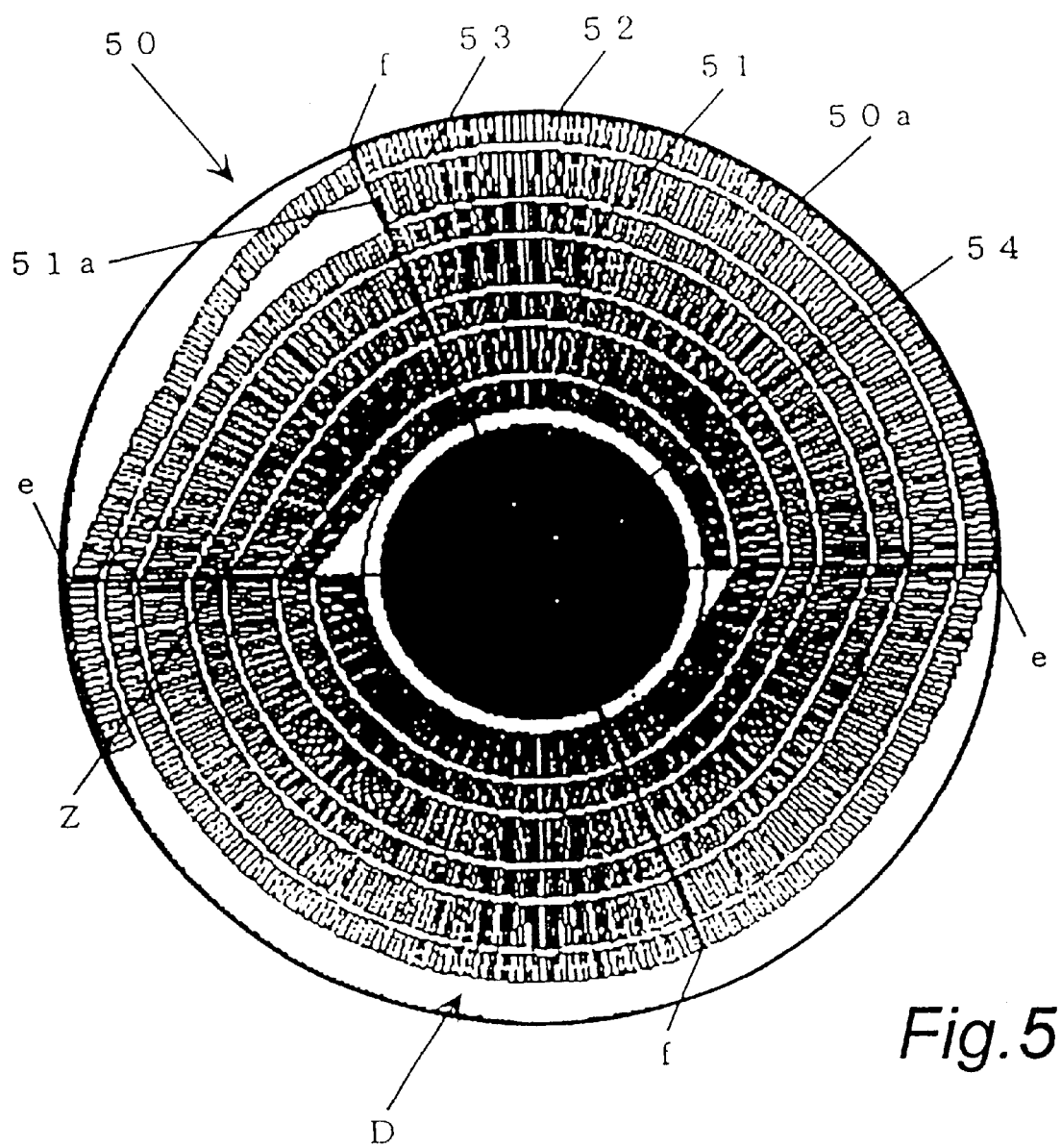

A positive electrode plate 51 of about 0.65 mm in thickness and of about 75 mm in length was used to produce a nickel-metal hydride storage battery 50 in the same manner as in the nickel-metal hydride storage battery 10 of Example 1. In FIG. 5 the storage battery is shown as Comparative Example 4. In a group of spiral electrodes E of the storage battery 50 an additional separator (not shown) was adhered to the separator 53 at the outside of the winding end 51a of positive electrode plate 51, and the winding end 51a of positive electrode plate 51 was positioned on a line f—f shorter than a maximum diametric line (line e—e ) of the group of spiral electrodes E.

(9) COMPARATIVE EXAMPLE 5

A foamed nickel substrate plate of about 0.60 mm in thickness cut into a predetermined length (for example, about 80 mm) was impregnated with a slurry of active material in the same manner as in Example 1 and rolled under pressure after dried to produce a positive electrode plate 31. The positive electrode plate 31 and the negative electrode plate 12 produced as described above were used to produce a nickel-metal hydride storage battery 30 in the same manner as in the nickel-metal hydride storage battery 10 of Example 1. In FIG. 3, the storage battery 30 is shown as Comparative Example 5. In a group of spiral electrodes B of the storage battery 30, any additional separator was not adhered to the separator 33 at the outside of the winding end 31a of positive electrode plate 31 and the winding end 31a of positive electrode plate 31 was positioned on a maximum diametric line (line b—b ) of the group of spiral electrodes B.

(10) COMPARATIVE EXAMPLE 6

A nickel-metal hydride storage battery 30 was manufactured as Comparative Example 6 in the same manner as in the nickel-metal hydride storage battery 10 of Example 1. Provided that, an adhesive tape (not shown) of polypropylene was adhered the separator 33 at the outside of the winding end 31a of positive electrode plate 31 as shown in FIG. 3. In a group of spiral electrodes B of the nickel-metal hydride storage battery, the winding end 31a of positive electrode plate 3l was placed on a maximum diametric line (line b—b) of die group of spiral electrodes B.

(11) COMPARATIVE EXAMPLE 7

A nickel-metal hydride storage battery 30 was manufactured as Comparative Example 7 in the same manner as in the nickel-metal hydride storage battery 10 of Example 1. Provided that any additional separator was not adhered to the separator 33 at the outside of the winding end 31a of positive electrode plate 31 and that the separator 33 placed at the outermost periphery of the group of spiral electrodes B was not secured in place by melting. In the storage battery 30, the winding end 31a of positive electrode plate 31 was placed on a maximum diametric line (line b—b) of the group of spiral electrodes B.

3. Test of Storage Battery (1) Measurement of Short-Circuit

Every 100 pieces of the batteries of Examples 1–4 and Comparative Examples 1–7 were prepared to measure an occurrence ratio of short-circuit in the respective batteries in a condition where each group of spiral electrodes in the batteries is retained in contact with the interior of a cell casing through a current-collector. Thus, a resistance value between the positive and negative electrode plates in the respective storage batteries was measured, and a resistance value less than 1.5 k was deemed as an internal short-circuit to calculate an occurrence ratio of short-circuit in the respective storage batteries.

(2) Measurement of Battery Capacity

Every 100 pieces of the batteries of Examples 1–4 and Comparative Examples 1–7 were respectively charged by a charging current of 120 mA (0.1C) for sixteen hours and rested for one hour. Thereafter, the storage batteries were discharged at 240 mA (0.2C) respectively until the final discharge voltage becomes 1.0 V and rested for one hour. The cycle of charging and discharging described above was repeated three times to measure each discharge capacity of the storage batteries.

4. Result of Test

To investigate the occurrence ratio of short-circuit in relation to the maximum diameter portion of each group of spiral electrodes, the occurrence ratio of short-circuit and each capacity of the storage batteries measured as described above were listed as shown in the following Table 1.

TABLE 1

| Kind of Battery | Positive electrode Length | Positive electrode Thickness | Negative electrode Length | Negative electrode Thickness | Reinforcement of Separator | Maximum diameter position | Occurrence ratio of short-circuit (%) | Battery capacity (mAh) |
|---|---|---|---|---|---|---|---|---|
| Example 1 | 80 | 0.60 | 105 | 0.40 | Yes | Winding end of positive electrode | 0 | 1242 |
| Comparative Example 1 | 80 | 0.60 | 105 | 0.40 | No | Winding end of positive electrode | 5 | 1245 |
| Comparative Example 2 | 75 | 0.60 | 105 | 0.40 | Yes | Other | 0 | 1168 |
| Comparative Example 3 | 75 | 0.60 | 105 | 0.40 | No | Other | 0 | 1173 |
| Comparative Example 4 | 75 | 0.65 | 105 | 0.40 | Yes | Other | 4 | 1248 |

As is understood from the Table 1, the following facts have been confirmed. In comparison of the storage battery of Example 1 with the storage battery of Comparative Example 1, in which the winding end of positive electrode plate was positioned on the maximum diametric line (line a—a or line b—b) of each group of spiral electrodes, the occurrence ratio of short-circuit in the storage battery of Example 1 was 0% at the capacity of 1242 mAh, while the occurrence ratio of short-circuit in the storage battery of Comparative Example 1 was 5% at the capacity of 1245 mAh. From this fact, it has been confirmed that the storage battery of Example 1 is superior in restraint of short-circuit in comparison with the storage battery of Comparative Example 1. When the storage battery of Comparative Example 1 was disassembled to investigate the short-circuit, it was found that the short-circuit had been caused by bur fragments of the foamed nickel substrate plate penetrating the separator 23 at the winding end 21a (a point X in FIG. 3) of positive electrode plate 21.

In comparison of the storage battery of Comparative Example 2 with the storage battery of Comparative Example 3, in which the winding end of positive electrode plate was displaced from the maximum diametric line of each group of spiral electrodes, each occurrence ratio of short-circuit in the storage batteries of Comparative Examples 2 and 3 was 0%. However, the capacity of the storage battery of Comparative Example 2 whose separator was reinforced by the additional separator of the same kind of its material at the outside of the winding end of the positive electrode plate was 1168 mAh, while the capacity of the battery of Comparative Example 3 whose separator was not reinforced at the outside of the winding end of the positive electrode plate was 1173 mAh. Thus, it has been confirmed that each capacity of the batteries of Comparative Examples 2 and 3 decreases greatly lower than the capacity (1242 mAh) of the battery of Example 1 since each positive electrode plate in the former batteries is shorter than that in the latter battery.

In comparison of the battery of Comparative Example 4 in which the positive electrode plate of 0.65 in thickness was used, the occurrence ratio of short-circuit in the battery of Comparative Example 4 was 4% at the capacity of 1248 mAh. When the battery of Comparative Example 4 was disassembled to investigate the short-circuit, it was found that the short-circuit had been caused due to partial breakage of the separator caused by crack of the positive electrode plate 51 at its central portion (a point Z in FIG. 5). In this respect, it is seemed that the crack was caused by an increase of the thickness of the positive electrode plate 51.

From the foregoing facts, it has been confirmed that a storage battery of higher capacity and high quality can be obtained in the case that the winding end of the positive electrode plate is positioned in the maximum diameter portion of the group of spiral electrodes and that the separator is reinforced by an additional separator of the same kind of material at the outside of the winding end of the positive electrode plate.

(2) Occurrence Ratio in Relation to Breakage of Positive Electrode Plate

To investigate the occurrence ratio of short-circuit in relation to disconnection or breakage of the positive electrode plate, each occurrence ratio and capacity of the batteries of Examples 1 and 2 in comparison with the batteries of Comparative Examples 1 and 5 were listed as shown in the following Table 2.

TABLE 2

| Kind of Battery | Positive electrode Length | Positive electrode Thickness | Negative electrode Length | Negative electrode Thickness | Reinforcement of Separator | Breakage | Maximum diameter position | Occurrence ratio of short-circuit (%) | Battery capacity (mAh) |
|---|---|---|---|---|---|---|---|---|---|
| Example 1 | 80 | 0.60 | 105 | 0.40 | Separator | After impregnation | Winding end of positive electrode | 0 | 1242 |

TABLE 2-continued

| Kind of Battery | Positive electrode | | Negative electrode | | Reinforcement of Separator | Breakage | Maximum diameter position | Occurrence ratio of short-circuit (%) | Battery capacity (mAh) |
|---|---|---|---|---|---|---|---|---|---|
| | Length | Thickness | Length | Thickness | | | | | |
| Example 2 | 80 | 0.60 | 105 | 0.40 | Separator | Before impregnation | Winding end of positive electrode | 0 | 1247 |
| Comparative Example 1 | 80 | 0.60 | 105 | 0.40 | None | After impregnation | Winding end of positive electrode | 5 | 1245 |
| Comparative Example 5 | 80 | 0.60 | 105 | 0.40 | None | Before impregnation | Winding end of positive electrode | 3 | 1244 |

As shown in the Table 2, the occurrence ratio of short-circuit was 3% in the storage battery of Comparative Example 5, wherein the positive electrode plate 51 was produced by the steps of cutting a formed nickel substrate plate into a predetermined length, impregnating an active material into the substrate plate after drying thereof and rolling the substrate plate under pressure, and wherein the separator 53 was not reinforced at the outside of the winding end 51a of the positive electrode plate 51. In contrast with the battery of Comparative Example 5, any short-circuit did not occur in the storage battery 10 of Example 2 wherein the separator 13 was reinforced by the additional separator 13a of the same kind of material at the outside of the winding end 11a of the positive electrode plate 11.

In addition, the occurrence ratio of short-circuit was 5% in the storage battery of Comparative Example 1, wherein the positive electrode plate 31 was produced by the steps of impregnating the active material into the substrate plate, rolling the substrate plate under pressure after drying thereof and cutting the substrate plate into the predetermined length, and wherein the separator 33 was not reinforced at the outside of the winding end 31a of positive electrode plate 31. In contrast with the battery of Comparative Example 1, any short-circuit did not occur in the storage battery 10 of Example 1, wherein the separator 13a was reinforced by the additional separator of the same kind of material at the outside of the winding end 11a of positive electrode plate 11.

From the foregoing facts, it has been confirmed that a restraint effect of the short-circuit is enhanced in the case that the positive electrode plate is produced by the steps of impregnating the active material into the substrate plate, rolling the substrate plate under pressure after dried it and cutting the substrate plate into the predetermined length and that the separator is reinforced by the additional separator at the outside of the winding end of tie positive electrode plate.

When the storage batteries 30 and 50 of Comparative Examples 5 and 1 were disassembled to investigate the short-circuit caused therein. It was found that the short-circuit had been caused by bur fragments of the foamed nickel substrate plate penetrating the separator 33 at respective winding ends 33a, 35a of the positive electrode plates, (see a point X in FIG. 3 and a point Z in FIG. 5). In this respect, it is seemed that the occurrence ratio of short-circuit in the battery 30 of Comparative Example 5 was increased due to bur fragments of the substrate plate occurred when the substrate plate for the positive electrode plate had been cut into the predetermined length after impregnated with the active material.

In addition, capacities of the batteries 10 of Examples 1 and 2 and of Comparative Examples 1 and 5 were 1242 mAh, 1247 mAh, 1245 mAh and 1244 mAh respectively.

(3) Occurrence Ratio of Short-circuit in Relation to Reinforcement Material of Separators To investigate a relationship between the occurrence ratio of short-circuit and the reinforcement material of the separators, each occurrence ratio and capacity of the batteries of Example 1 and Comparative Example 6 were listed as shown in the following Table 3.

TABLE 3

| Kind of Battery | Positive electrode | | Negative electrode | | Reinforcement of Separator | Maximum diameter position | Occurrence ratio of short-circuit (%) | Battery capacity (mAh) |
|---|---|---|---|---|---|---|---|---|
| | Length | Thickness | Length | Thickness | | | | |
| Example 1 | 80 | 0.60 | 105 | 0.40 | Separator | Winding end of positive electrode | 0 | 1242 |
| Comparative Example 6 | 80 | 0.60 | 105 | 0.40 | Adhesive tape | Winding end of positive electrode | 1 | 1213 |

As shown in the Table 3, the occurrence ratio of short-circuit was 1% in the battery of Comparative Example 6 wherein the adhesive tape of polypropylene was adhered to the separator 33 at the outside of tie winding end 31a of positive electrode plate 31. In contrast with the battery of Comparative Example 6, any short-circuit did not occur in the battery of Example 1 wherein the additional separator of the same material was adhered to the separator 13 at the outside of the winding end 11a of positive electrode plate 11. This means that the adhesive tape was ineffective to prevent an occurrence of the bur fragments penetrating the separator.

In this instance, the capacity of the battery 10 of Example 1 was 1242 mAh, while the capacity of the battery 30 of Comparative Example 6 was 1213 mAh less than that of the battery 10. When the batteries were disassembled, it was found that the positive electrode plate 11 became black due to charging and discharging of the battery, while the color change degree of the positive electrode plate 31 in the battery 30 of Comparative Example 6 was small at a portion where the adhesive tape was adhered to the separator. This means that the charging and discharging reaction of the positive electrode plate was disturbed by the adhesive tape, resulting in a decrease of the capacity of the battery. It is, therefore, desirable that a non-woven fabric capable of retaining electrolyte is used as the additional separator to prevent the bur fragments penetrating the separator without causing any decrease of the battery capacity.

(4) Occurrence Ratio of Short-circuit in Relation to a Fixed Condition of the Winding End of a Separator in a Group of Spiral Electrodes To investigate a relationship between an occurrence ratio of short-circuit and a fixed condition of the winding end of a separator in a group of spiral electrodes, each occurrence ratio of short-circuit in the storage batteries of Examples 3, 4 and in the storage batteries of Comparative Examples 1, 7 was listed in relation to each capacity of the batteries as shown in the following Table 4.

short-circuit was not found. From this fact, it has been confirmed that such reinforcement of the separator at its winding end is effective to reduce the occurrence ratio of short circuit in the storage battery.

Although the separator may not be secured at its winding end in the case that the negative electrode plate is placed at the outermost periphery of the group of spiral electrodes as in the storage battery of Example 4, the additional separator can be removed so that a higher capacity of more than about 90 mAh is obtainable and that the occurrence ratio of short-circuit becomes 0%. This means that the reinforcement of the separator becomes most effective in the group of spiral electrodes having the negative electrode plate placed at its outermost periphery.

In the cylindrical storage battery of the present invention described above, it is to be noted that the separator 13 was reinforced by the additional separator 13a adhered thereto at the outside of the winding end 11a of the positive electrode plate 11 in a condition where the winding end 11a of the positive electrode plate 11 was positioned on the maximum diametric line (line a—a) of the group of spiral electrodes A. Similarly, the separator 23 was reinforced by the additional separator 23a adhered thereto at the outside of the winding end 21a of the positive electrode plate 21 in a condition where the winding end 21a of the positive electrode plate 21 was positioned on the maximum diametric line (line a'—a') of the group of spiral electrodes A'. Such arrangement of the additional separators is effective to restrain an occurrence of internal short-circuit in the storage battery without causing any decrease of the battery capacity.

Although in the embodiments described above, a separator of the same basis weight as that of the primary separator adapted for the group of spiral electrodes was used as the additional separator for reinforcement, it is preferable that a

TABLE 4

| Kind of Battery | Positive electrode | | Negative electrode | | Reinforcement of Separator | Fixing at outermost periphery | Occurrence ratio of short-circuit (%) | Battery capacity (mAh) |
| --- | --- | --- | --- | --- | --- | --- | --- | --- |
| | Length | Thickness | Length | Thickness | | | | |
| Example 3 | 80 | 0.60 | 105 | 0.40 | Yes | No | 0 | 1242 |
| Example 4 | 80 | 0.60 | 105 | 0.40 | Yes | No | 0 | 1333 |
| Comparative Example 1 | 80 | 0.60 | 105 | 0.40 | No | Yes | 5 | 1245 |
| Comparative Example 7 | 80 | 0.60 | 105 | 0.40 | No | No | 6 | 1240 |

As shown in the Table 4, the occurrence ration of short-circuit was 5% in the battery of Comparative Example 1 wherein the separator 33 placed at the outermost periphery of the group of spiral electrodes was fixed in place at its winding end, while the occurrence ratio of short-circuit was 6% in the battery of Comparative Example 7 wherein the separator placed at the outermost periphery of the group of spiral electrodes was not secured in place. In this respect, it is seemed that the short-circuit in Comparative Example 7 was caused by the fact flat the winding end 31a of the positive electrode plate 31 was wound off due to spring-back phenomenon thereof.

Although in the group of spiral electrodes A, the separator 13 placed at the outermost periphery was not secured in place, the separator 13 was reinforced by the additional separator 13a adhered thereto at the outside of the winding end 11a of the positive electrode plate. In the storage battery of Example 3 including the group of spiral electrodes A, any separator of 0.5–1.5 times in basis weight more than the primary separator is used as the additional separator for reinforcement. Although in the embodiments described above, a non-sintered nickel positive electrode plate was used as the nickel positive electrode plate of the storage battery, a sintered nickel positive electrode plate may be used to obtain the same result. It is also to be noted that the present invention may be adapted to a nickel-cadmium storage battery to obtain the same result.

What is claimed is:

1. A cylindrical alkaline storage battery including a cell casing formed to store an amount of electrolyte comprised of an aqueous alkaline solution, and a group of spiral electrodes contained in the cell casing, the group of spiral electrodes being composed of positive and negative electrode plates spirally wound with a separator interposed therebetween in such a manner that the negative electrode plate is placed at an outermost periphery of the group of spiral electrodes, wherein a winding terminal end of the positive electrode plate is positioned in a maximum interior diameter portion of the group of spiral electrodes, and wherein the separator is partly reinforced by an additional separator of the same kind of material as that of the separator adhered thereto at an outside of the winding terminal end of the positive electrode plate.

2. A cylindrical alkaline storage battery as claimed in claim 1, wherein the positive electrode plate is made of an electrode substrate plate in the form of a porous metal plate having a three dimensional mesh-structure impregnated with a positive electrode active material.

3. A cylindrical alkaline storage battery as claimed in claim 1, wherein the positive electrode plate is in the form of an electrode plate cut into a predetermined length after impregnated with an active material and rolled under pressure.

4. A cylindrical alkaline storage battery as claimed in claim 1, wherein the winding end of the separator placed at the outermost periphery of the group of spiral electrodes is not secured in position.

5. A cylindrical alkaline storage battery including a cell casing formed to store an amount of electrolyte comprised of an aqueous alkaline solution, and a group of spiral electrodes contained in the cell casing, the group of spiral electrodes being composed of positive and negative electrode plates spirally wound with a separator interposed therebetween in such a manner that the negative electrode plate is placed at an outermost periphery of the group of spiral electrodes, wherein a winding terminal end of the positive electrode plate is positioned in a maximum interior diameter portion of the group of spiral electrodes, and wherein the separator is partly reinforced by an additional separator of the same kind of material as that of the separator adhered thereto at an outside of only the winding terminal end of the positive electrode plate.

6. A cylindrical alkaline storage battery as claimed in claim 5, wherein the positive electrode plate is made of an electrode substrate plate in the form of a porous metal plate having a three dimensional mesh-structure impregnated with a positive electrode active material.

7. A cylindrical alkaline storage battery as claimed in claim 5, wherein the positive electrode plate is in the form of an electrode plate cut into a predetermined length after impregnated with an active material and rolled under pressure.

8. A cylindrical alkaline storage battery as claimed in claim 5, wherein the winding end of the separator placed on the outermost periphery of the group of spiral electrodes is not secured in position.

* * * * *